United States Patent [19]

Kumagai et al.

[11] Patent Number: 4,736,230

[45] Date of Patent: Apr. 5, 1988

[54] COMPOSITION FOR SEMICONDUCTOR PORCELAIN, AND SEMICONDUCTOR PORCELAIN AND CAPACITOR BY USE OF SAME

[75] Inventors: Motoo Kumagai, Yokohama; Masato Nagano, Bibai; Michiaki Sakaguchi, Iwamisawa, all of Japan

[73] Assignees: Canon Kabushiki Kaisha; Nippon Oil & Fats Co., Ltd., both of Tokyo, Japan

[21] Appl. No.: 852,182

[22] Filed: Apr. 15, 1986

[30] Foreign Application Priority Data

Apr. 17, 1985 [JP]  Japan ................................. 60-81839

[51] Int. Cl.$^4$ ........................... H01B 3/12; H01G 4/12
[52] U.S. Cl. ..................................... 357/10; 252/521; 361/321; 501/137; 501/139
[58] Field of Search ................ 252/520, 521; 501/139, 501/138, 137; 361/321 C; 357/10

[56] References Cited

U.S. PATENT DOCUMENTS

| | | | |
|---|---|---|---|
| 3,951,873 | 4/1976 | Kikuchi et al. | 252/521 |
| 4,014,707 | 3/1977 | Tanaka et al. | 252/521 |
| 4,643,984 | 2/1987 | Abe et al. | 501/139 |

*Primary Examiner*—William D. Larkins
*Attorney, Agent, or Firm*—Fitzpatrick, Cella, Harper & Scinto

[57] ABSTRACT

A composition for semiconductor porcelain comprisies:
(a) 35.5 to 70 mol % of $MgTiO_3$,
(b) 26.5 to 61 mol % of $BaTiO_3$,
(c) a grain boundary improver, and
(d) 0.01 to 0.2 mol % of an element selected from rare earth elements and the elements belonging to the group V of the periodic table.

16 Claims, 1 Drawing Sheet

COMPOSITION FOR SEMICONDUCTOR PORCELAIN, AND SEMICONDUCTOR PORCELAIN AND CAPACITOR BY USE OF SAME

BACKGROUND OF THE INVENTION

1. Field of the Invention

This invention relates to a composition for intergranular insulation type semiconductor porcelain, which is improved in various electrical characteristics, particularly small in temperature coefficient, has high dielectric constant and is easy in handling, and a semiconductor porcelain and a capacitor by use of the composition.

2. Related Background Art

In recent years, with weight reduction and miniaturization of electronic circuit substrates and electronic instruments, a capacitor as one of the electronic parts is desired to be miniaturized with higher performance and the materials therefor have been actively developed. Among them, for its very high dielectric constant of $5 \times 10^4$ to $7 \times 10^4$, $BaTiO_3$ type compositions for semiconductor porcelain and, for its little change ratio with temperature of electrostatic capacity and also small value of dielectric loss, $SrTiO_3$ type compositions for semiconductor porcelain are attracting attention, respectively.

However, when a $BaTiO_3$ type composition for semiconductor porcelain is used, there are involved the drawbacks such that the voltage dependence of electrostatic capacity is great, that the change ratio with temperature of electrostatic capacity is great, that waveform distortion is generated, that there is generation of noise due to electrostriction, that the dielectric loss under high voltage alternate current is great, that the change with lapse of time is great and that it is susceptible to thermal shock.

On the other hand, an $SrTiO_3$ type composition for semiconductor porcelain has the drawbacks that it is smaller in dielectric constant as compared with the $BaTiO_3$ type and also that management in steps in preparation of a capacitor can be done with extreme difficulty.

Further, in the case of $SrTiO_3$ type, the change ratio with temperature of electrostatic capacity cannot satisfactorily be small as compared with $BaTiO_3$ type. Particularly, in these days when the progress in electronic techniques is so rapid, it is necessary for obtaining a highly improved high performance device to improve various characteristics including those as mentioned above.

Particularly, it has been earnestly desired to develop a capacitor having high dielectric constant in the small value of temperature coefficient of dielectric constant. However, by use of the capacitor materials of the prior art, the relationship between dielectric constant and its temperature coefficient was such that the value of temperature coefficient becomes greater as the dielectric constant is made greater, and vice versa.

As another example, an intergranular insulation type semiconductor porcelain formed by use of the materials of the prior art had also the drawback that it is readily fractured.

SUMMARY OF THE INVENTION

The present invention has been accomplished in view of the above points and its object is to provide a composition for semiconductor porcelain markedly improved in characteristics as compared with the prior art, and a semiconductor instrument and a capacitor by use of the composition.

Another object of the present invention is to provide a composition for semiconductor porcelain improved in various electrical characteristics and a semiconductor porcelain and a capacitor by use of the composition.

Still another object of the present invention is to provide a semiconductor porcelain and a capacitor having dielectric constant and a small value in its change ratio with temperature.

Still another object of the present invention is to provide a semiconductor instrument and a capacitor which can be produced with very easy management of the steps during manufacturing.

It is also an another object of the present invention to provide a composition for semiconductor porcelain comprising:

(a) 35.5 to 70 mol % of $MgTiO_3$,
(b) 26.5 to 61 mol % of $BaTiO_3$,
(c) a grain boundary improver, and
(d) 0.01 to 0.2 mol % of an element selected from rare earth elements or the elements belonging to the group V of the periodic table.

Still another object of the present invention is to provide a semiconductor porcelain comprising a large number of semiconductive crystal grains, each comprising (a) 35.5 to 70 mol % of $MgTiO_3$,
(b) 26.5 to 61 mol % of $BaTiO_3$,
(c) a grain boundary improver, and
(d) 0.01 to 0.2 mol % of an element selected from rare earth elements or the elements belonging to the group V of the periodic table, and an insulator region formed at the crystal grain boundaries.

Still another object of the present invention is to provide a capacitor comprising a pair of electrodes and a layer sandwiched between these electrodes, said layer having a large number of semiconducting crystal grains, each comprising:

(a) 35.5 to 70 mol % of $MgTiO_3$,
(b) 26.5 to 61 mol % of $BaTiO_3$,
(c) a grain boundary improver, and
(d) 0.01 to 0.2 mol % of an element selected from rare earth elements or the elements belong to the group V of the periodic table, and an insulator region formed at the crystal grain boundaries.

DESCRIPTION OF PREFERRED EMBODIMENTS

Figure 1:
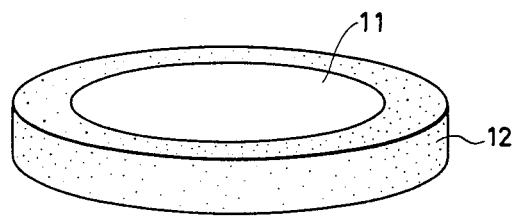
FIG. 1 is a schematic perspective view of a capacitor.

The composition for semiconductor porcelain of the present invention is characterized by containing 35.5 to 70 mol % of $MgTiO_3$, 26.5 to 61 mol % of $BaTiO_3$, a grain boundary improver and 0.01 to 0.2 mol % of an element selected from among rare earth elements or the elements belonging to the group V of the periodic table as the valence controller.

Also, the semiconductor instrument and the capacitor of the present invention is characterized by having the above constitution as the main constitution.

By giving the above constitution, it becomes possible to improve characteristics, particularly markedly various electrical characteristics, and management of the steps during manufacturing can be done very easily.

$MgTiO_3$, which is one of the constituent materials in the present invention, has generally a positive temperature coefficient of the electric constant with great capacity (value of Q) and it is a material with low dielectric constant. However, according to the result of intensive study by the present inventors, in addition to the co-presence of $BaTiO_3$ having high dielectric constant and being readily made into a semiconductor porcelain within a specific range of amount, by adding a grain boundary improver and a valence controller, a semiconductor procelain or a capacitor having high dielectric constant which cannot be expected for respective individual cases with markedly smaller temperature dependent rate of change of the dielectric constant as compared with the prior art can be obtained.

Also, during preparation of such a semiconductor porcelain or capacitor, even if there may be some variance in the amount coated during application of the diffused materials, its influence on the characteristics is very small and therefor management of the steps can be done very easily.

The amounts of $MgTiO_3$ and $BaTiO_3$ formulated which is one of the specific feature of the present invention are limited to the values as specified above for the following reason.

That is, when $MgTiO_3$ is less than 35.5 mol % or $BaTiO_3$ is in excess of 80 mol %, the absolute value of temperature coefficient becomes great. When $MgTiO_3$ is in excess of 70 mol % or $BaTiO_3$ is less than 26.5 mol %, the dielectric constant will be lowered markedly. For such reasons, the amounts of $MgTiO_3$ and $BaTiO_3$ formulated should preferably be restricted to the ranges as specified above.

In the present invention, in order to provide an insulator region at the crystal grain boundary of the semiconductor porcelain, namely a crystal grain boundary layer which is made an insulator, at least one of Ca, Cr, Mn, Cu and Tl is added into the crystal grain boundary layer as the additive for insulation.

These additives for insulation are applied on the surface of the primarily fired semiconductor porcelain prepared by primary firing treatment in the form of an oxide appropriately made into a paste in usual cases, followed by diffusion into the crystal grain boundaries during the secondary firing treatment to effect insulation.

During this treatment, in the present invention, a grain boundary improver such as $SiO_2$, $Bi_2O_3$, etc., can be added to improve dielectric characteristics of the semiconductor porcelain and the capacitor obtained.

The function of the grain boundary improver may be considered to stabilize and uniformize the characteristics by making diffusion of the additives for insulation onto the grain boundaries when the additives for insulation are diffused onto the crystal grain boundaries by firing in the air after coating of the additives for insulation on the surface of the primarily fired semiconductor porcelain.

In the present invention, the amount of the grain boundary improver may be determined as desired, but, in the case of $SiO_2$, it is made preferably 0.3 to 6.5 mol %, while, in the case of $Bi_2O_3$, it is made preferably 0.02 to 0.14 mol %.

$SiO_2$ and $Bi_2O_3$ as the grain boundary improver may be used either alone or in combination with each other, but it is preferable to add at least $SiO_2$.

When $SiO_2$ and $Bi_2O_3$ are used in combination, the amounts added may be within the same range as in the case of being individually added.

The amounts of $SiO_2$ and $Bi_2O_3$ as the grain boundary improvers added in the present invention are desirably within the ranges as specified above for the following reasons. In the case of $SiO_2$, if the amount is lower than the lower limit, the absolute value of the temperature coefficient will be increased while the Q value tends to be lowered, and when it is cover the upper limit, dielectric constant tends to be lowered. In the case of $Bi_2O_3$ at either a level greater or smaller than the above range, the dielectric constant tends to be lowered and the absolute value of the temperature coefficient increased.

The valence controller to be used in the present invention includes elements belonging to the group v of the periodic table, particularly vanadium elements such as Nb, Ta, etc., nitrogen group elements such as Sb, etc., or rare earth elements such as Y, La, Ce, etc., as the preferable components, and these are generally used in the form of oxides.

The valence controller is not limited to a single kind but plural kinds may be used but it is preferable to select plural kinds mutually from rare earth elements or from the elements of the group V of the periodic table.

The amount of the valence controller added may be determined as desired depending on the requisite characteristics of the semiconductor porcelain or the capacitor, and the semiconductor can be formed by firing treatment in a reducing atmosphere. The range of the amount is made from 0.01 to 0.2 mol %, because semiconductor formation can be effected with marked difficulty by the firing treatment in the reducing atmosphere, if it is outside of said range.

Figure 2:
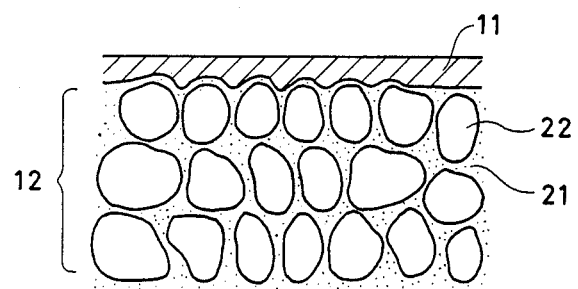
FIG. 2 is a partial schematic sectional view of the capacitor shown in FIG. 1.

FIG. 1 and FIG. 2 show an example when the present invention is applied for an intergranular insulation type semiconductor porcelain capacitor. FIG. 1 is a schematic perspective view and FIG. 2 is a partial schematic sectional view.

The capacitor shown in the Figures has electrodes 11 constituted of Al, Au respectively (in the Figures, only the electrode on the upper surface is shown) provided on the upper and lower surfaces of the intergranular insulation type semiconductor porcelain layer 12. The semiconductor porcelain layer 12 contains a large number of crystal grains 22 of the semiconductor porcelain through the dielectric layer (insulator region) 21 formed at the grain boundaries.

The size of the crystal grains may be determined appropriately depending on the electrical characteristics demanded and the formulation amounts of the constituent materials, firing conditions, etc., but it is generally 1 $\mu$m to 100 $\mu$m preferably 2 $\mu$m to 80 $\mu$m.

EXAMPLE 1

The respective starting materials were weighed and mixed by grinding in a wet system ball mill for 12 hours so that a semiconductor porcelain with a compositional ratio indicated in Table 1 could be obtained. After drying, the mixture was mixed with a small amount of polyvinyl alcohol as the binder, qranulated into 24 to 80 mesh and molded by a hydraulic press into a disc of 20 mm in diameter and 0.8 mm in thickness. Next, this molded disc was fired in air at 950° C. for 1 hour to burn the binder. After the product was cooled to room temperature, it was fired in a reducing atmosphere comprising 70 vol. % of nitrogen and 30 vol. % of hydrogen at 1360° C. for 2 hours.

The semiconductor porcelain thus obtained was coated with about 30 mg of a paste obtained by kneading CuO with varnish at a weight ratio of 1:1, and fired in air at 1400° C. for 1 hour to form an insulating layer at the crystal grain boundary. A capacitor was formed by attaching gold on both flat surfaces of this product by vapor deposition to provide electrodes thereon and various electrical characteristics were measured. The results are shown in Table 2.

As shown in Table 1 and Table 2, the interglanular insulation type semiconductor porcelain composition satisfying the composition within the range of the present invention is very useful. For example, while the temperature coefficient of the dielectric constant is −640 to 450 ppm/° C., the electric constant is very higher as 5300 to 7600 as compared with that of the prior art. Further, it is useful in industry, because management of the steps during manufacturing is very easy.

Further, it was confirmed that other various electrical characteristics were also improved as compared with those of the prior art.

TABLE 1

| * Sample No. | Formulated composition (mol %) | | | | Valence controller |
|---|---|---|---|---|---|
| | MgTiO$_3$ | BaTiO$_3$ | SiO$_2$ | Bi$_2$O$_3$ | |
| 1 | 64.0 | 33.4 | 2.36 | 0.08 | La: 0.16 |
| 2 | 40.5 | 56.9 | 2.48 | 0.08 | La: 0.04 |
| 3 | 52.0 | 41.9 | 5.92 | 0.08 | Y: 0.10 |
| 4 | 52.0 | 47.2 | 0.62 | 0.08 | Y: 0.10 |
| 5 | 48.5 | 48.8 | 2.48 | 0.12 | Nb: 0.10 |
| 6 | 48.5 | 48.8 | 2.56 | 0.04 | Nb: 0.10 |
| 7 | 48.5 | 48.7 | 2.70 | — | La: 0.10 |
| 8 | 48.5 | 51.3 | — | 0.10 | La: 0.10 |
| 9 | 48.5 | 49.0 | 2.32 | 0.08 | La: 0.05 Y: 0.05 |
| 10 | 48.5 | 49.0 | 2.32 | 0.08 | Nb: 0.05 Ta: 0.05 |
| 11 | 35.5 | 59.5 | 4.82 | 0.08 | Ce: 0.10 |
| 12 | 70.0 | 28.0 | 1.82 | 0.08 | Ce: 0.10 |
| 13 | 68.0 | 26.5 | 5.32 | 0.08 | Sb: 0.10 |
| 14 | 37.5 | 61.0 | 1.32 | 0.08 | Sb: 0.10 |
| 15 | 48.5 | 51.1 | 0.3 | — | Nb: 0.10 |
| 16 | 48.5 | 44.9 | 6.5 | — | Nb: 0.10 |
| 17 | 51.0 | 48.9 | — | 0.02 | La: 0.08 |
| 18 | 51.0 | 48.78 | — | 0.14 | La: 0.08 |
| 19 | 51.0 | 46.61 | 2.3 | 0.08 | La: 0.01 |
| 20 | 51.0 | 46.42 | 2.3 | 0.08 | La: 0.2 |
| 21 | 51.0 | 46.61 | 2.3 | 0.08 | Nb: 0.01 |
| 22 | 51.0 | 46.42 | 2.3 | 0.08 | Nb: 0.2 |
| 23 | 72.0 | 27.0 | 0.82 | 0.08 | La: 0.10 |
| 24 | 34.5 | 60.5 | 4.82 | 0.08 | La: 0.10 |
| 25 | 36.0 | 63.0 | 0.82 | 0.08 | La: 0.10 |
| 26 | 70.5 | 24.5 | 4.82 | 0.08 | La: 0.10 |
| 27 | 51.0 | 41.6 | 7.22 | 0.08 | La: 0.10 |
| 28 | 51.0 | 48.7 | 0.12 | 0.08 | La: 0.10 |
| 29 | 48.0 | 49.2 | 2.52 | 0.18 | La: 0.10 |
| 30 | 48.0 | 49.3 | 2.59 | 0.01 | La: 0.10 |

*: 1–22 are Examples and 23–30 are Comparative example.

TABLE 2

| | Electrical characteristics | |
|---|---|---|
| Sample No. | *1 Dielectric constant s) | *2 Temperature coefficient of dielectric constant (ppm/°C.) |
| 1 | 5900 | −490 |
| 2 | 6800 | −510 |
| 3 | 6000 | −480 |
| 4 | 6500 | −560 |
| 5 | 6900 | −540 |
| 6 | 7100 | −620 |
| 7 | 6100 | −590 |
| 8 | 6900 | −600 |
| 9 | 7000 | −540 |
| 10 | 6800 | −530 |
| 11 | 6000 | −570 |
| 12 | 5500 | −450 (min) |
| 13 | 5300 (min) | −490 |
| 14 | 7600 (max) | −640 (max) |
| 15 | 7000 | −630 |
| 16 | 6000 | −590 |
| 17 | 5800 | −620 |
| 18 | 5900 | −640 (max) |
| 19 | 6400 | −570 |
| 20 | 6200 | −540 |
| 21 | 6000 | −560 |
| 22 | 6300 | −530 |
| 23 | 2900 | −430 |
| 24 | 4900 | −1400 |
| 25 | 7900 | −1700 |
| 26 | 2300 | −700 |
| 27 | 3800 | −590 |
| 28 | 6200 | −1300 |
| 29 | 4800 | −1600 |
| 30 | 4300 | −1200 |

*1: measured at +25° C., frequency 1 KHz
*2: calculated from the values measured at the temperature range from −10 to +85° C., with +25° C. as the standard As can be seen from the above description, according to the present invention, there can be obtained a semiconductor porcelain and a capacitor with excellent reproducibility at low cost, which are high in dielectric constant, small in temparature dependent change ratio of dielectric constant and easy in management of the steps during manufacturing. Also, as compared with the intergranular insulation type semiconductor porcelain of the prior art, it is less susceptible to fracture and also very excellent in handling when worked into capacitors, etc. Thus, it is very useful in industry also in aspect of workability in addition to the characteristics and management of production steps as described above.

What we claimed is:

1. A composition for semiconductor porcelain comprising:
    (a) 35.5 to 70 mol % of MgTiO$_3$,
    (b) 26.5 to 61 mol % of BaTiO$_3$,
    (c) a grain boundary improver, and
    (d) 0.01 to 0.2 mol % of an element selected from rare earth elements and the elements belonging to the group V of the periodic table.

2. A composition for semiconductor porcelain according to claim 1, wherein the grain boundary improver is SiO$_2$.

3. A composition for semiconductor porcelain according to claim 1, wherein the grain boundary improver is Bi$_2$O$_3$.

4. A composition for semiconductor porcelain according to claim 1, wherein the element belonging to rare earth elements is selected from Y, La and Ce.

5. A composition for semiconductor porcelain according to claim 1, wherein the element belonging to the group V of the periodic table is selected from Nb, Sb and Ta.

6. A semiconductor porcelain comprising a large number of semiconductive crystal grains, each comprising
    (a) 35.5 to 70 mol % of MgTiO$_3$,
    (b) 26 5 to 61 mol % of BaTiO$_3$,
    (c) a grain boundary improver, and
    (d) 0.01 to 0.2 mol % of an element selected from rare earth elements and the elements belonging to the group v of the periodic table, and an insulator region formed at the crystal grain bounderies.

7. A semiconductor porcelain according to claim 6, wherein the insulator region contains at least one selected from Ca, Cr, Mn, Cu and Tl.

8. A semiconductor porcelain according to claim 7, wherein the grain boundary improver is $SiO_2$.

9. A semiconductor porcelain according to claim 7, wherein the grain boundary improver is $Bi_2O_3$.

10. A semiconductor porcelain according to claim 7, wherein the element belonging to rare earth elements is selected from Y, La and Ce.

11. A semiconductor porcelain according to claim 7, wherein the element belonging to the group V of the periodic table is selected from Nb, Sb and Ta.

12. A capacitor comprising a pair of electrodes and a layer sandwiched between these electrodes, said layer comprising a large number of semiconductive crystal grains, each comprising
    (a) 35.5 to 70 mol % of $MgTiO_3$,
    (b) 26.5 to 61 mol % of $BaTiO_3$,
    (c) a grain boundary improver, and
    (d) 0.01 to 0.2 mol % of an element selected from rare earth elements and the elements belonging to the group V of the periodic table, and an insulator region formed at the crystal grain boundaries.

13. A capacitor according to claim 12, wherein the grain boundary improver is $SiO_2$.

14. A capacitor according to claim 12, wherein the grain boundary improver is $Bi_2O_3$.

15. A capacitor according to claim 12, wherein the element belonging to rare earth elements is selected from Y, La and Ce.

16. A capacitor according to claim 12, wherein the element belonging to the group V of the periodic table is selected from Nb, Sb and Ta.

* * * * *

UNITED STATES PATENT AND TRADEMARK OFFICE
CERTIFICATE OF CORRECTION

PATENT NO. : 4,736,230

DATED : April 5, 1988

INVENTOR(S) : MOTOO KUMAGAI, ET AL.

It is certified that error appears in the above-identified patent and that said Letters Patent is hereby corrected as shown below:

COLUMN 3

Line 25, "feature" should read --features--.

COLUMN 4

Line 16, "group v" should read --group V--.

COLUMN 5

Table 2, " *1            " should read --    *1         --.
           Dielectric                        Dielectric
           constant s)                       constant($\epsilon$s)

COLUMN 6

Table 2-c, "    *1        " should read --    *1         --.
             Dielectric                        Dielectric
             constant s)                       constant($\epsilon$s)
  Line 29, "temparature" should read --temperature--.
  Line 38, "claimed" should read --claim--.

UNITED STATES PATENT AND TRADEMARK OFFICE
CERTIFICATE OF CORRECTION

PATENT NO. : 4,736,230
DATED : April 5, 1988
INVENTOR(S) : MOTOO KUMAGAI, ET AL.          Page 2 of 2

It is certified that error appears in the above-identified patent and that said Letters Patent is hereby corrected as shown below:

COLUMN 7

Line 1, "group v" should read --group V--.
Line 2, "bounderies." should read --boundaries.--.

Signed and Sealed this

Thirty-first Day of October, 1989

Attest:

DONALD J. QUIGG

Attesting Officer          Commissioner of Patents and Trademarks